United States Patent [19]

Sakamoto et al.

[11] Patent Number: 4,909,869

[45] Date of Patent: Mar. 20, 1990

[54] METHOD OF MOUNTING A WINDOW GLASS ON A VEHICLE BODY

[75] Inventors: Shunji Sakamoto, Higashihiroshima; Yoshimi Shimbara, Hiroshima; Shigeo Okamizu, Kitakyushu, all of Japan

[73] Assignee: Mazda Motor Corporation, Hiroshima, Japan

[21] Appl. No.: 128,864

[22] Filed: Dec. 4, 1987

[30] Foreign Application Priority Data

Dec. 4, 1986 [JP] Japan .................................. 61-289674
Dec. 4, 1986 [JP] Japan .................................. 61-289675

[51] Int. Cl.[4] ............................................... B25J 11/00
[52] U.S. Cl. ..................................... 156/64; 156/108; 156/364; 358/101; 358/903; 364/478; 414/730; 901/43; 901/47
[58] Field of Search ................ 414/730; 358/101, 107, 358/903; 364/478, 513; 156/64, 358, 378, 364, 108, 350; 901/47, 43

[56] References Cited

U.S. PATENT DOCUMENTS

| | | | |
|---|---|---|---|
| 4,453,303 | 6/1984 | Leddet | 29/407 |
| 4,564,410 | 1/1986 | Clitheros et al. | 156/356 |
| 4,589,184 | 5/1986 | Asano et al. | 901/74 |
| 4,715,772 | 12/1987 | Kanayama | 414/730 |

OTHER PUBLICATIONS

"A Microcomputer Based, Real-Time Robotics System", *Robotics Age*, Nov./Dec. 1982.

*Primary Examiner*—David Simmons
*Attorney, Agent, or Firm*—Gerald J. Ferguson, Jr.

[57] ABSTRACT

A method of mounting a window glass on a vehicle body comprises the steps of attaching a positioning member for defining a position of the window glass to a window frame portion of the vehicle body in such a manner that a difference in brightness of color perceptible for an image sensor is made between the window frame portion and at least a part of the positioning member, detecting a location of the positioning member on the window frame portion by means of the image sensor, and fitting the window glass to the window frame portion by means of a robot operative to move along a working path which is modified in response to a detection output of the image sensor.

16 Claims, 7 Drawing Sheets

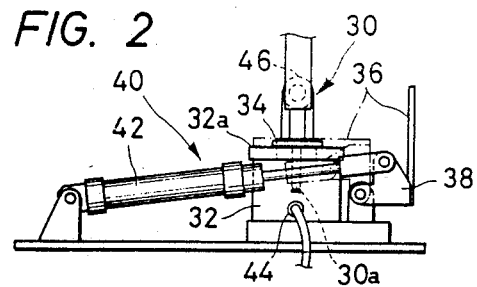
FIG. 2
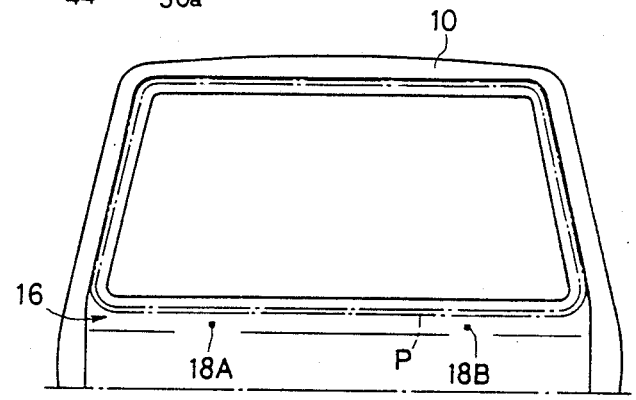
FIG. 3
FIG. 4
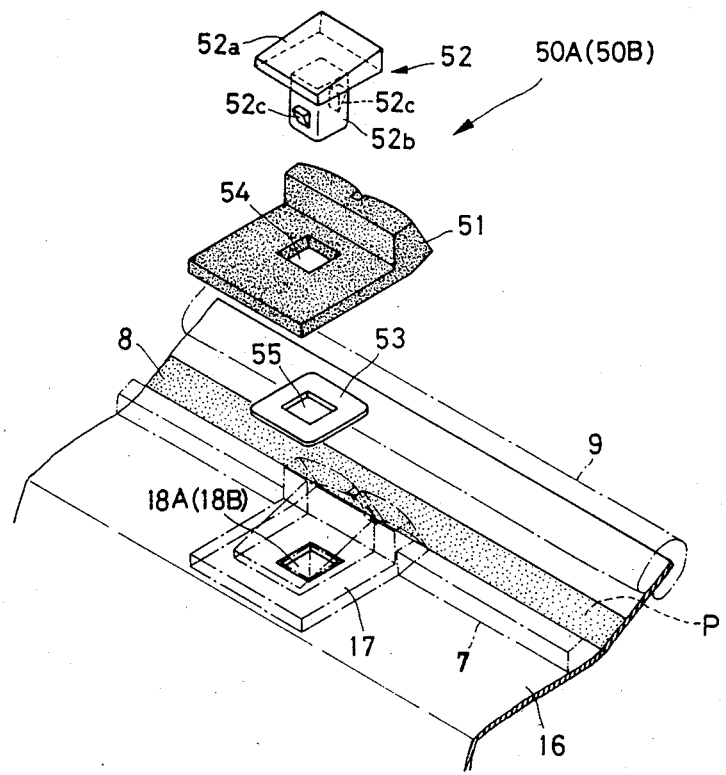

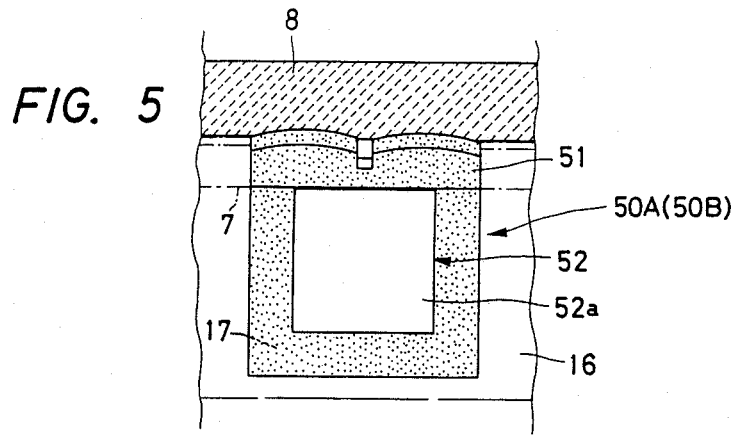
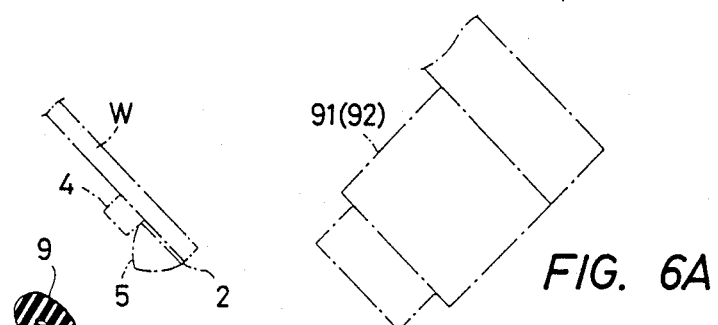
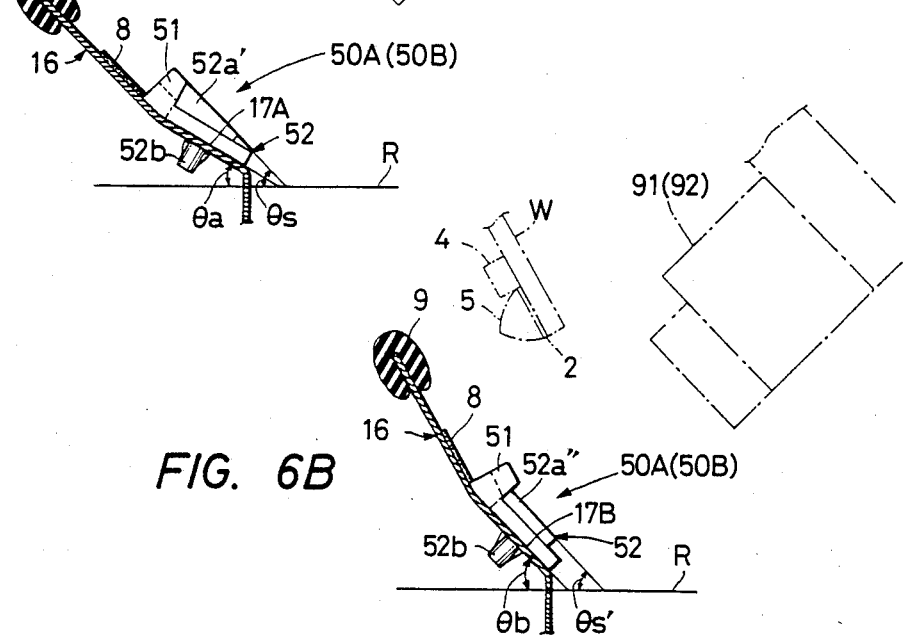

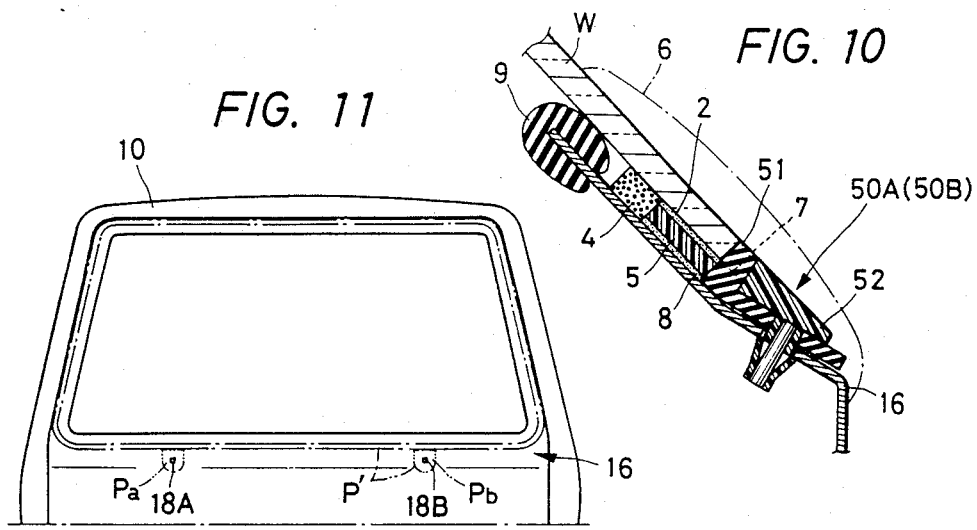
FIG. 10
FIG. 11
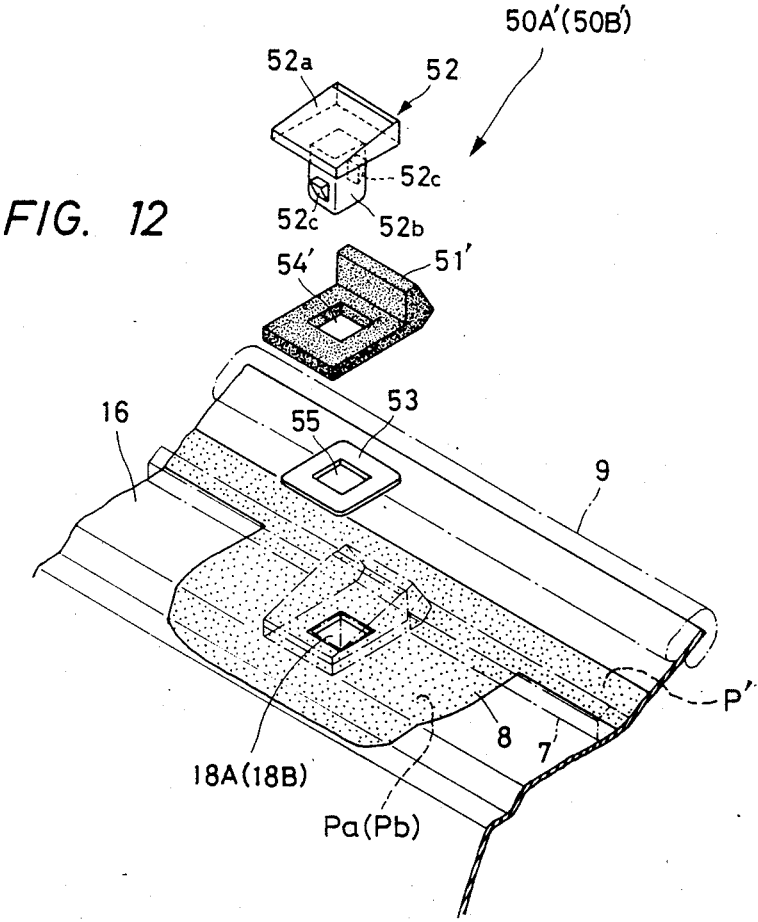
FIG. 12

METHOD OF MOUNTING A WINDOW GLASS ON A VEHICLE BODY

BACKGROUND OF THE INVENTION

1. Field of the Invention

The present invention relates generally to a method of mounting a window glass on a vehicle body, in which a robot is used for fitting the window glass to a window frame portion of the vehicle body which is conveyed to a window glass setting station provided in a vehicle body assembly line.

2. Description of the Prior Art

In a vehicle body assembly line, vehicle bodies having passed through a coating process are supported by respective carriers mounted on a vehicle body carrying conveyor and transported successively into a window glass setting station by the vehicle body carrying conveyor so as to be provided thereon with window glasses. At the window glass setting station, an industrial robot is installed for holding the window glass on which an adhesive agent has been put with a predetermined pattern in a pretreatment process and fitting the window glass automatically to a window frame portion of each of the vehicle bodies conveyed into the window glass setting station.

However, the vehicle body conveyed into the window glass setting station is usually accompanied with positional deviations arising in relation to the robot due to, for example, unavoidable errors in size of each vehicle body and each carrier supporting the vehicle body, errors in position of the vehicle body in relation to the carrier or errors in transportation of the vehicle body performed by the vehicle body carrying conveyor. Therefore, in the case where the robot holds the window glass which is to be fitted to the window frame portion of the vehicle body and operates to move along a predetermined working path in order to carry the window glass to the window frame portion of the vehicle body, it is feared that the window glass is not fitted properly to the window frame portion of the vehicle body by the robot so as not to be appropriately mounted on the vehicle body.

For the purpose of avoiding such a disadvantage, there has been proposed, by the same assignee as the present application, as disclosed in U.S. Pat. No. 4,715,772, a method of fitting a window glass to a window frame portion of a vehicle body including the steps of detecting a location of a positioning member, which is attached to the window frame portion of the vehicle body for defining a position of the window glass, by means of an image sensor such as a miniature camera employing a charge coupled device (CCD) in the window glass setting station, and modifying the working path along which the robot moves for carrying the window glass to the window frame portion of the vehicle body in response to a detection output of the image sensor so that the window glass carried by the robot is properly fitted to the window frame portion of the vehicle body.

In the event of such a method using the image sensor, however, since the location of the positioning member cannot be detected correctly by the image sensor when the window frame portion of the vehicle body is painted to be similar in brightness of color to the positioning member, it is still feared that the window glass carried by the robot is not fitted properly to the window frame portion of the vehicle body conveyed into the window glass setting station. For example, when the positioning member is colored white and the window frame portion of the vehicle body is painted white, light cream or the like so that there is only a small difference in brightness of color between the positioning member and the window frame portion of the vehicle body, the image sensor which has been ordinarily put to practical use is unable to distinguish clearly the positioning member from the window frame portion of the vehicle body surrounding the positioning member and produces an incorrect detection output concerning the location of the positioning member, and therefore the working path of the robot cannot be modified properly.

OBJECTS AND SUMMARY OF THE INVENTION

Accordingly, it is an object of the present invention to provide a method of mounting a window glass on a vehicle body which avoids the foregoing problems encountered with the prior art.

Another object of the present invention is to provide a method of mounting a window glass on a vehicle body, in which a robot is employed to fit the window glass to a window frame portion of the vehicle body and an image sensor is also employed to detect a location of a positioning member which is attached to the window frame portion of the vehicle body for defining a position of the window glass on the window frame portion and to produce a detection output so that a working path along which the robot moves to hold the window glass and carry the window glass held thereby to the window frame portion of the vehicle body is modified in response to the detection output of the image sensor, and through which the window glass can be carried by the robot accurately to the window frame portion of the vehicle body so as to be fitted there properly even though the window frame portion of the vehicle body is painted to be similar in brightness of color to the positioning member.

A further object of the present invention is to provide a method of mounting a window glass on a vehicle body, in which a robot is employed to fit the window glass to a window frame portion of the vehicle body and an image sensor is also employed to detect a location of a positioning member which is attached to the window frame portion of the vehicle body for defining a position of the window glass on the window frame portion and to produce a detection output so that a working path along which the robot moves to hold the window glass and carry the window glass held thereby to the window frame portion of the vehicle body is modified in response to the detection output of the image sensor, and through which the positioning member can be detected correctly by the image sensor so that the detection output of the image sensor is properly obtained even though the window frame portion of the vehicle body is painted to be similar in brightness of color to the positioning member.

According to the present invention, there is provided a method of mounting a window glass on a vehicle body, which comprises the steps of attaching a positioning member for defining a position of the window glass to a window frame portion of the vehicle body in such a manner that a difference in brightness of color perceptible for an image sensor is made between the window frame portion of the vehicle body and at least a part of the positioning member, detecting a location of the positioning member on the window frame portion of the vehicle body by means of image sensor, and fitting the window glass to the window frame portion of the vehicle body by means of a robot operative to move along a working path which is modified in response to a detection output of the image sensor.

In an embodiment of method according to the present invention, the window frame portion of the vehicle body is provided thereon with such a positioning member as to have a central portion of an upper surface thereof and a peripheral portion of the upper surface around the central portion which are arranged to be different in brightness of color from each other so as to make the difference in brightness of color perceptible for the image sensor between the window frame portion of the vehicle body and a part of the positioning member, and at least a location of one of the central portion and the peripheral portion of the upper surface of the positioning member is detected by means of the image sensor.

Further, in another embodiment of method according to the present invention, at least a part of the window frame portion of the vehicle body which is adjacent to the positioning member attached to the window frame portion and a window glass supporting area provided on the window frame portion to be bonded with the window glass are covered with a primer, so as to make the difference in brightness of color perceptible for the image sensor between the window frame portion and the positioning member.

In accordance with the present, invention difference in brightness of color which is perceptible for the image sensor is surely made between the window frame portion of the vehicle body and at least a part of the positioning member regardless of a color arrangement of the vehicle body and the location of the positioning member is detected always correctly by the image sensor. Therefore, for example, when the vehicle body conveyed into a window glass setting station which is provided in a vehicle body assembly line and in which the robot is installed is accompanied with positional deviation arising in relation to the robot, the working path of the robot is modified properly in response to the detection output of the image sensor so as to compensate appropriately the positional deviation accompanying with the vehicle body. Accordingly, the window glass held by the robot is fitted properly and surely to the window frame portion of the vehicle body by the robot independently of the color arrangement of the vehicle body even though the vehicle body is accompanied with the positional deviation arising in relation to the robot.

The above, and other objects, features and advantages of the present invention will become apparent from the following detailed description which is to be read in conjunction with the accompanying drawings.

BRIEF DESCRIPTION OF THE DRAWINGS

FIG. 2 is a schematic side view showing an example of a primer conserving device for preventing a primer from hardening provided in the primer applying station shown in FIG. 1;

FIG. 3 is a schematic illustration used for explaining a step of applying a primer to a vehicle body in the first embodiment of method according to the present invention.

FIGS. 4, 5 6A and 6B are schematic illustrations used for explaining a step of attaching a positioning member to a vehicle body in the first embodiment of method according to the present invention;

FIG. 10 is a schematic fragmentary sectional view showing a part of a window frame portion of a vehicle body to which a window glass is fitted in accordance with the first embodiment of method according to the present invention;

FIG. 11 is a schematic illustration used for explaining a step of applying a primer to a vehicle body in a second embodiment of method according to the present invention.

FIG. 12 is a schematic illustration used for explaining a step of attaching a positioning member to a vehicle body in a second embodiment of method according to the present invention;

DESCRIPTION OF THE PREFERRED EMBODIMENTS

The invention will now be described by way of example with reference to the accompanying drawings.

FIGS. 1 to 10 are illustrations used for explanation of a first embodiment of method of mounting a window glass on a vehicle body according to the present invention.

Figure 1:
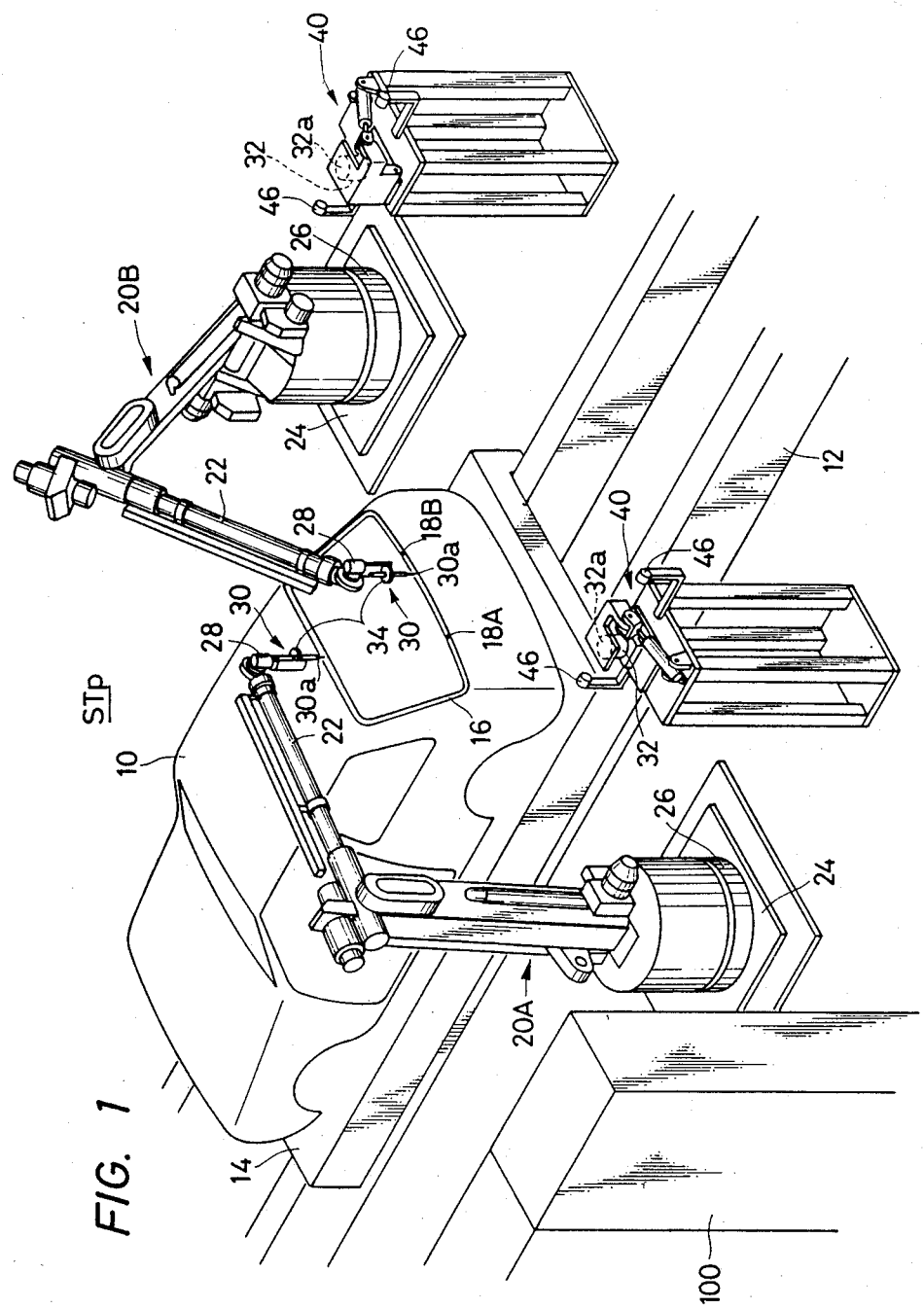
FIG. 1 is a schematic perspective view showing a part of a primer applying station is which one of the steps of a first embodiment of method according to the present invention is carried out.

FIG. 1 shows a part of a primer applying station STp provided in a vehicle body assembly line which is so arranged that a plurality of vehicle bodies of different types are assembled therein. In the primer applying station STp, working of applying a primer to a vehicle body 10 is carried out as a pretreatment for working of mounting a window glass on the vehicle body 10.

Referring to FIG. 1, the vehicle body 10 is put on a carriage 14 which is slidable along a pair of parallel rails 12 extending along the vehicle body assembly line. The carriage 14 is moved into the primer applying station STp and stopped therein so as to place the vehicle body 10 at a predetermined location in the primer applying station STp. The vehicle body 10 conveyed to the primer applying station STp has been painted to have one or more of predetermined several different colors and provided with a window frame portion 16 to which a rear window glass is to be fitted. The window frame portion 16 is provided at a lower part thereof with a couple of mounting holes 18A and 18B which are located to be distant equally to the right and left from an imaginary center line of the vehicle body 10 extending longitudinally.

In the primer applying station STp, a couple of robots 20A and 20B which are constituted in duplicate are installed to be used for applying the primer to the window frame portion 16 of the vehicle body 10. Each of the robot 20A, which works for apply the primer to a left half of the window frame portion 16, and the robot 20B, which works for apply the primer to a right half of the window frame portion 16, is formed into a playback robot of the articulated type having an arm 22 and a wrist 28 extending from the arm 22, which can operate with movements similar to the movements of the upper limbs of mankind. The arm 22 is mounted on a body 26 fixed on a base 24 to be swingable horizontally and vertically in relation to the base 24 and the wrist 28 i arranged to be rotatable around an axis of the arm 22 and in a plane including the axis of the arm 22.

The wrist 28 of each of the robots 20A and 20B is provided at its end portion with a primer holder 30 having a brush 30a. The primer holder 30 is operative to guide, for example, a black primer fed thereto from a primer supplier (not shown in the drawings) to the brush 30a. The primer holder 30 is further provided with a plate member 34 positioned above the brush 30a. The plate member 34 is used for covering an opening 32a formed on a brush receiving chamber 32 of a primer conserving device 40 which is provided in the vicinity of each of the robots 20A and 20B when the brush 30a attached to the primer holder 30 is inserted into the brush receiving chamber 32.

As shown in detail in FIG. 2, the primer conserving device 40 comprises the brush receiving chamber 32 as mentioned above, a movable lid 36 for covering the opening 32a formed on the brush receiving chamber 32, and a cylinder 42 for driving the movable lid 36 through link member 38 to open and close the opening 32a. The brush receiving chamber 32 is supplied with inactive gas through a gas inlet port 44 from a gas supplier (not shown in the drawings). The inactive gas fed to the brush receiving chamber 32 is returned through a gas outlet port to the gas supplier through a gas discharging portion (not shown in the drawings) so as to circulate through a closed path including the gas supplier and the brush receiving chamber 32. The primer conserving device 40 is further provided with a photoelectric switch 46 composed of a light source and a photodetector facing each other for detecting the primer holder 30 passing therethrough.

With such an arrangement as described above, working conditions for each of the robots 20A and 20B including a working path along which the primer holder 30 is shifted and a working speed at which the Primer holder 30 is moved are predetermined manually or through a numerical control for each type of vehicle body and stored in a memory contained in a robot controller 100. In such a case, the working path is so arranged that the primer holder 30 causes the brush 30a to scan over a window glass supporting area P of the window frame portion 16 provided to be bonded with the window glass, which is shown as an area surrounded by a dot-dash line in FIG. 3.

In the primer applying station STp in which the robots 20A and 20B are installed and the primer conserving devices 40 are placed to be close to the robots 20A and 20B, respectively, the robots 20A and 20B are standing by ready to operate when the vehicle body 10 is not placed at the predetermined location in the primer applying station STp. When the robots 20A and 20B are on standby, the cylinder 42 of the primer conserving device 40 operates to move the movable lid 36 to be opened through the link member 38 and the brush 30a attached to the primer holder 30 is inserted through the opening 32a into the brush receiving chamber 32 of the primer conserving device 40 in such a manner that the plate member 34 fixed to the primer holder 30 covers the opening 32a. Accordingly, the brush 30a is put in the brush receiving chamber 32 filled up with the inactive gas and thereby the primer fed to the brush 30a is prevented from hardening during a period in which each of the robots 20A and 20B is inoperative.

When the vehicle body 10 is transported to be placed in the primer applying station STp, the robot controller 100 supplies the robots 20A and 20B with control signals representing the working conditions for the robots 20A and 20B, respectively. On that occasion, positional deviation of the vehicle body 10 from the predetermined position in the primer applying station STp at which the vehicle body 10 is to be placed is detected by means of a image sensor (not shown in the drawings) and the working conditions for each of the robots 20A and 20B are modified in response to a detection output of the image sensor. Each of the robots 20A and 20B supplied with the control signals operates to lift up the primer holder 30 and move the same toward the vehicle body 10 from the brush receiving chamber 32 of the primer conserving device 40. The movement of the primer holder 30 to go away from the brush receiving chamber 32 is detected by the photoelectric switch 46 and thereby the cylinder 42 is extended to cause the movable lid 36 to shut the opening 32a, as shown with dot-dash lines in FIG. 2.

Then, the primer colored black is fed to the brushes 30a attached to the primer holders 30 which are supported respectively by the robots 20A and 20B. The robot 20A causes the primer holder 30 to shift in such a manner that the brush 30a attached to the primer holder 30 which is supported by the robot 20A traces the left half of the window glass supporting area P of the window frame portion 16 of the vehicle body 10, and the robot 20B causes the primer holder 30 to shift in such a manner that the brush 30a attached to the primer holder 30 which is supported by the robot 20B traces the right half of the window glass supporting area P of the window frame portion 16 of the vehicle body 10, as shown in FIG. 1.

With such operations of the robots 20A and 20B, the primer 8 is applied to the window glass supporting area P of the window frame portion 16, as shown partially in FIG. 4. Then, after such application of the primer 8 to the window glass supporting area P of the window frame portion 16 of the vehicle body 10, each of the robots 20A and 20B causes the primer holder 30 to shift so as to put the brush 30a attached to the primer holder 30 in the brush receiving chamber 32 of the primer conserving device 40 and returns to be on standby.

After that, in the primer applying station STp or a subsequent station, positioning members 50A and 50B for defining a position of the window glass are mounted by a worker on the lower part of the window frame portion 16 of the vehicle body 10, to which the primer 8 is applied, so as to engage with the mounting holes 18A and 18B, respectively, as shown in FIG. 4. Each of the positioning members 50A and 50B comprises a body element 51 made of, for example, black rubber and a fastening element 52 made of, for example, white plastic and used for fastening the body element 51 to the window frame portion 16 of the vehicle body 10. The body element 51 is provided with a rectangular center hole 54, and the fastening element 52 is composed of a flat portion 52a having a upper slant surface and a square tube portion 52b extending downward from the flat portion 52a to be inserted into the rectangular center hole 54 of the body element 51 and the mounting hole 18A or 18B. The square tube portion 52b is provided with resilient projections 52c respectively on a pair of side surfaces thereof facing each other.

When each of the positioning members 50A and 50B is mounted on the window frame portion 16 of the vehicle body 10, as shown in FIG. 4, the body element 51 is placed on a positioning member mounting area 17 of the window frame portion 16 surrounding the mounting hole 18A or 18B with a spacer 53 which is provided with a rectangular center hole 55 and put between the positioning member mounting area 17 and the body member 51 so that both the rectangular center hole 54 of the body member 51 and the rectangular center hole 55 of the spacer 53 are positioned on the mounting hole 18A or 18B. Then, the square tube portion 52b of the fastening element 52 is inserted from the upper side of the body element 51 into the rectangular center hole 54 of the body element 51, the rectangular center hole 55 of the spacer 53, and the mounting hole 18A or 18B, so that the flat portion 52a of the fastening element 52 is put on the body element 51 and the resilient projections 52c provided on the square tube portion 52b of the fastening element 52 engage with a under surface of the window frame portion 16. As a result, the positioning members 50A and 50b which are engaged respectively with the mounting holes 18A and 18B are attached to the positioning member mounting areas 17 of the window frame portion 16 of the vehicle body 10 in such a manner that the flat portion 52a of the fastening element 52 forms a central part of the each of the positioning members 50A and 50B and a part of the body element 51 which is not covered by the fastening element 52 forms a peripheral part surrounding the central part of each of the positioning members 50A and 50B, as shown in FIG. 5.

Although the positioning member mounting area 17 of the window frame portion 16 of the vehicle body 10 has an inclination depending on the type of the vehicle body 10, the upper slant surface of the flat portion 52a of the fastening element 52 is arranged to have a substantially constant inclination regardless of the type of the vehicle body 10 when each of the positioning members 50A and 50B is attached to the window frame portion 16 of the vehicle body 10. For example, in the case where the window frame portion 16 of the vehicle body 10 is provided with a positioning member mounting area 17A which has a relatively small inclination $\theta_a$ in relation to a reference horizontal plane R, as shown in FIG. 6A, the fastening element 52 is provided with a flat portion 52a' which is shaped to have an upper surface slanted conspicuously so as to make a predetermined inclination $\theta_s$, as shown also in FIG. 6A, and in the case where the window frame portion 16 of the vehicle body 10 is provided with a positioning member mounting area 17B which has a relatively large inclination $\theta_b$ in relation to the reference horizontal plane R, as shown in FIG. 6B, the fastening element 52 is provided with a flat portion 52a'' which is shaped to have an upper surface slanted little so as to make a predetermined inclination $\theta_s'$ which coincides substantially with the predetermined inclination $\theta_s$, as shown also in FIG. 6B.

Incidentally, before or after the positioning members 50A and 50B are attached to the window frame portion 16 of the vehicle body 10 to which the primer 8 is applied, a weather strip 9 is mounted on an inside fringe of the window frame portion 16, as shown in FIGS. 4, 6A and 6B, and a dam rubber 7 is attached to the window frame portion 16 to extend along the window glass supporting area P to which the primer 8 is applied, as shown in FIGS. 4 and 5.

Figure 7:
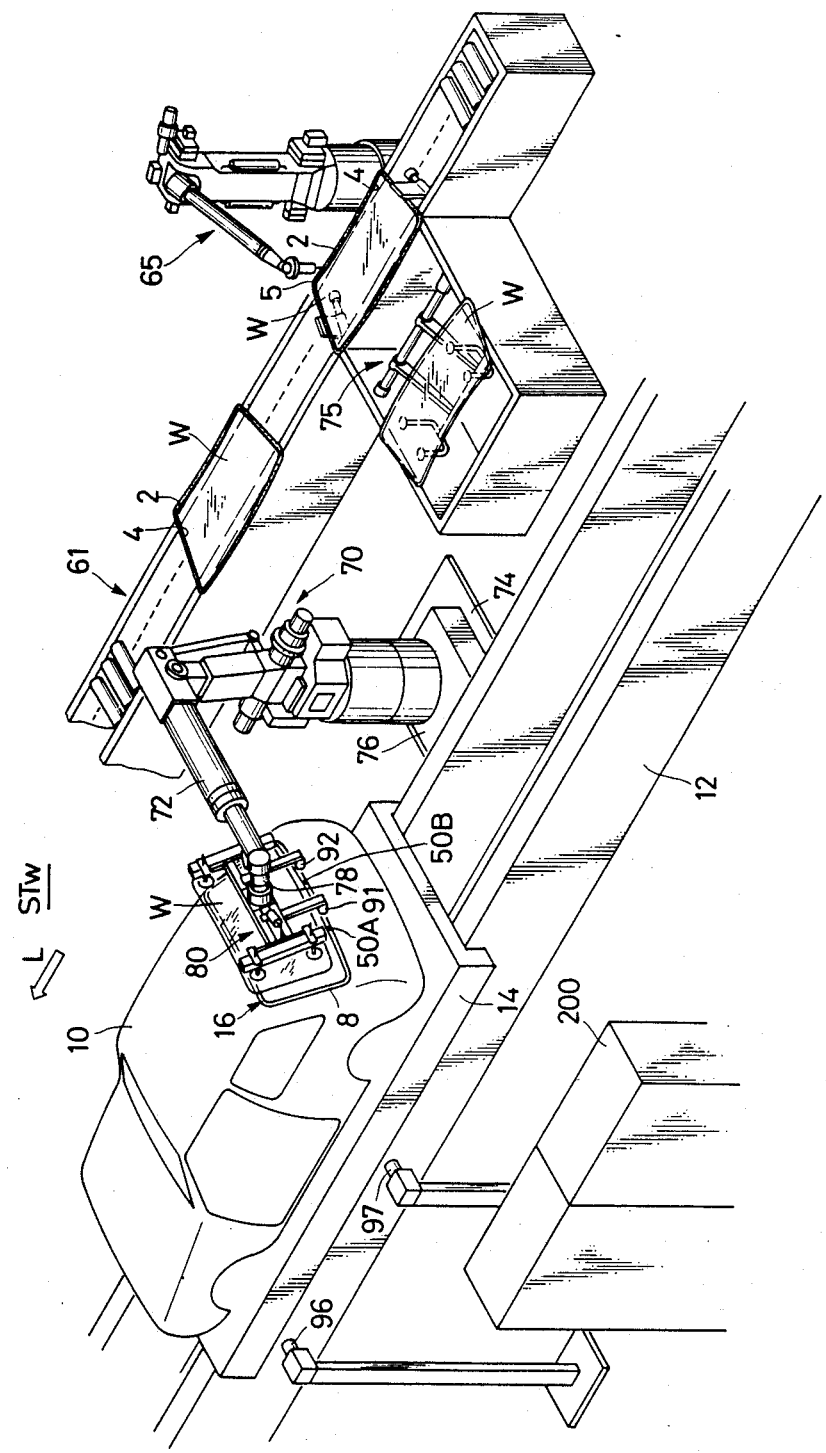
FIG. 7 is a schematic perspective view showing a part of a window glass setting station is which one of the steps of the first embodiment according to the present invention is carried out.

The vehicle body 10 in which the positioning members 50A and 50B are attached to the lower part of the window frame portion 16 is transported to be placed in a window glass setting station STw, as shown in FIG. 7. In the window glass setting station STw, a conveyor 61 for carrying a window glass W, a robot 65 for applying adhesive agent 5 of urethane resin to a peripheral portion of an inner surface of the window glass W which is carried to be placed at a predetermined position in the window glass setting station STw, and a robot 70 for holding the window glass W to which the adhesive agent 5 is applied and fitting the window glass W held thereby to the window frame portion 16 of the vehicle body 10, are installed. The window glass W carried by the conveyor 61 to the window glass setting station STw has a peripheral portion of the inner surface thereof to which a primer 2 is applied previously and a dam rubber 4 is also attached at the inside of an area of the primer 2. Then, the adhesive agent 5 is put by the robot 65 on the primer 2 which is applied to the peripheral portion of the inner surface of the window glass W. The window glass W to which the adhesive agent 5 is thus applied is turned upside down by a window glass turning device 75 so that an outer surface of the window glass W is in the upside, and then shifted toward the robot 70 so as to be positioned at a predetermined location close to the robot 70 without positional deviation in relation to the robot 70.

The robot 70 for holding the window glass W and fitting the window glass W held thereby to the window frame portion 16 of the vehicle body 10 is formed, in the same manner as the robots 20A and 20B, into a playback robot of the articulated type having an arm 72 and a wrist 78 extending from the arm 72. The arm 72 is mounted on a body 76 fixed on a base 74 to be swingable horizontally and vertically in relation to the base 74 and the wrist 78 is arranged to be rotatable around an axis of the arm 72 and in a plane including the axis of the arm 72.

Figure 8:
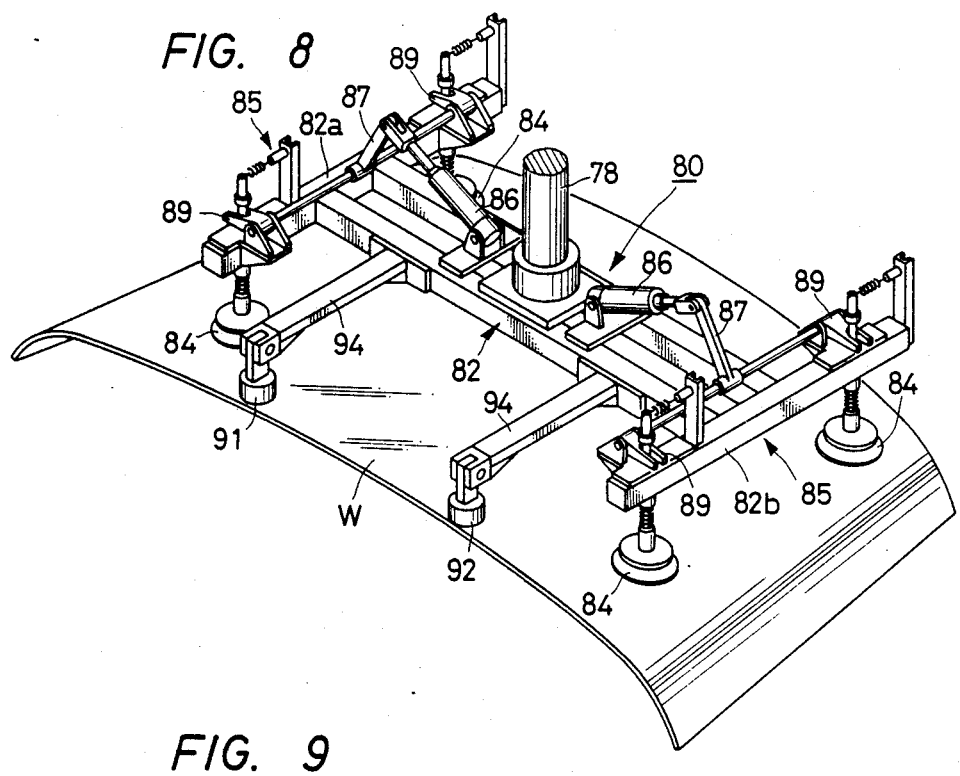
FIG. 8 is a schematic perspective view showing an example of a window glass holder provided in the window glass setting station shown in FIG. 7.

The wrist 78 of the robot 70 is provided with a window glass holder 80 for holding the window glass W by sticking the same. As shown in FIG. 8, the window glass holder 80 comprises a base structure 82 constituted generally in the shaped of H and coupled with the wrist 78 at a central portion thereof, four suction-cups 84 attached to end portions of side members 82a and 82b of the base structure 82, and a movable supporting mechanism 85 composed of cylinders 86, link members 87, engaging members 89 and so on for causing the suction-cups 84 selectively to be in a floating state in which each of the suction-cups 84 is able to ascend and descend in relation to the base structure 82 and to be in a restricted state in which each of the suction-cups 84 is unable to move. Each of the suction-cups 84 is supplied selectively with negative pressure from a negative pressure source (not shown in the drawings) to perform a sucking operation and with atmospheric air to be inoperative. The movable supporting mechanism 85 is operative to support the suction-cups 84 in the floating state when the window glass W is fitted to the window frame portion 16 of the vehicle body 10 by the robot 70 as described later, so that errors in curvature of the window glass W caused in manufacturing process are compensated, and to support the suction-cups 84 in the restricted state at other times.

A couple of image sensors 91 and 92 are mounted through respective brackets 94 on the base structure 82 of the window glass holder 80. The image sensors 91 and 92 are arranged to have therebetween a space corresponding to the space between the positioning members 50A and 50B attached to the window frame portion 16 of the vehicle body 10 for detecting locations of the positioning members 50A and 50B on the vehicle body 10. A compact video camera constituted with a charge coupled device may be used as each of the image sensors 91 and 92.

Figure 9:
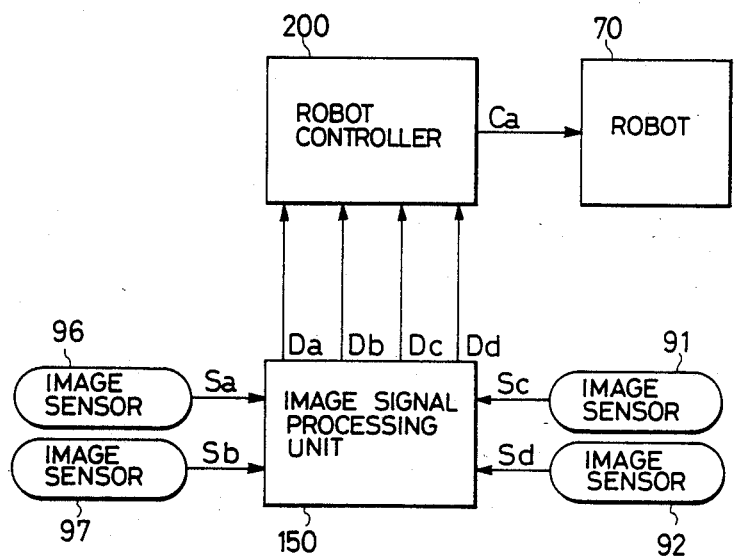
FIG. 9 is a block diagram showing one example of a control system for controlling a robot provided in the window glass setting station shown in FIG. 7 for fitting a window glass to a vehicle body.

With such an arrangement as described above in the window glass setting station STw, working conditions for the robot 70 including a working path along which the window glass holder 80 is shifted and a working speed at which the window glass holder 80 is moved are predetermined manually or through a numerical control and stored in a memory contained in a robot controller 200. When the vehicle body 10 is transported to be placed in the window glass setting station STw, locations of a front pillar and rear pillar of the vehicle body 10 are detected respectively by image sensors 96 and 97 installed in the window glass setting station STw. Each of the image sensors 96 and 97 is constitutes in the same manner as the image sensors 91 and 92 mentioned above. Then, as shown in FIG. 9, detection output signals Sa and Sb obtained respectively from the image sensors 96 and 97 are supplied to an image signal processing unit 150. The image signal processing unit 150 calculates, based on the detection output signals Sa and Sb, positional deviation of the vehicle body 10 in a transporting direction L from a predetermined position in the window glass setting station STw at which the vehicle body 10 is to be placed, and supplies the robot controller 200 with an output signal Da obtained in accordance with the result of calculation. The robot controller 200 operates to modify the working conditions stored in the memory contained therein based in response to the output signal Da of the image signal processing unit 150 and supplies the robot 70 with a control signal Ca representing modified working conditions.

The robot 70 which is supplied with the control signal Ca moves the window glass holder 80 to press the suction-cups 84 against the outer surface of the window glass W supplied from the window glass turning device 75 so as to hold the window glass W by sucking the same, and carries the window glass W to a predetermined position close to the window frame portion 16 of the vehicle body 10 in accordance with the control signal Ca, as shown in FIG. 7.

In such a situation, the peripheral portion of the window glass W held by the window glass holder 80 faces the window frame portion 16 of the vehicle body 10 and the image sensors 91 and 92 face the positioning means 50A and 50B attached to the window frame portion 16, respectively. The image sensors 91 and 92 detect the locations of the positioning members 50A and 50B, respectively, and detection output signals Sc and Sd obtained respectively from the image sensors 91 and 92 are supplied to the image signal processing unit 150, as shown in FIG. 9.

In this embodiment, since each of the positioning members 50A and 50B attached to the window frame portion 16 is provided at its central part with the flat portion 52a of the fastening element 52 which is colored white and also provided at its peripheral part surrounding the central part with the part of the body element 51 which is colored black, a conspicuous difference in brightness of color appears between the central part and the peripheral part of the each of the positioning members 50A and 50B, and therefore, the positioning members 50A and 50B are distinguished clearly from the vehicle body 10 by the image sensors 91 and 92, respectively. Accordingly, the locations of the positioning members 50A and 50B are detected correctly by the image sensors 91 and 92 regardless of a color arrangement of the vehicle body 10. Further, in each of the positioning members 50A and 50B attached to the window frame portion 16, the upper slant surface of the flat portion 52a of the fastening element 52 is arranged to have the substantially constant inclination in relation to the reference horizontal plane regardless of the type of the vehicle body 10, and therefore each of the image sensors 91 and 92 are not required to have any change in its attitude in response to the type of the vehicle body 10, as indicated with dot-dash lines in FIGS. 6A and 6B, so that the detection of the locations of the positioning members 50A and 50B can be carried out promptly with high accuracy.

When the detection output signals Sc and Sd obtained respectively from the image sensors 91 and 92 are supplied to the image signal processing unit 150, the image signal processing unit 150 calculates, based on the detection output signals Sc and Sd, positional deviations of the positioning members 50A and 50B from respective predetermined reference locations in the window glass setting station STw at which the positioning members 50A and 50B are to be placed respectively, that is, positional deviations of the window glass W from the window frame portion 16 in the directions of height, width and length of the vehicle body 10, and supplies the robot controller 200 with output signals Db, Dc and Dd obtained in accordance with the result of calculation. The robot controller 200 operates to modify the working conditions stored in the memory contained therein based in response to the output signals Db, Dc and Dd of the image signal processing unit 150 and supplies the robot 70 with a control signal Ca representing modified working conditions.

Under such controls by the image signal processing unit 150 and the robot controller 200, the robot 70 moves further the window glass W from the predetermined position close to the window frame portion 16 so as to eliminate the positional deviations accompanying with the window glass W in accordance with the modified working conditions, and then fits the window glass W to the window frame portion 16 of the vehicle body 10. A lower end portion of the window glass W fitted to the window frame portion 16 comes into contact with the positioning members 50A and 50B to be positioned thereby.

After the window glass W is fitted to the window frame portion 16 of the vehicle body 10, the suction-cups 84 are caused to be inoperative and the window glass holder 80 is removed from the window glass W by the robot 70. Since the lower end portion of the window glass W is in contact with the positioning members 50A and 50B, the window glass W is kept at a correct position to be fitted properly to the window frame portion 16 of the vehicle body 10 even though the adhesive agent 5 applied to the inner surface of the window glass W has not hardened when the window glass holder 80 is removed from the window glass W.

Through the above described process, the window glass W is mounted on the vehicle body 10 with hardening of the adhesive agent 5 which is put between the primer 8 applied to the window glass supporting area P of the window frame portion 16 of the vehicle body 10 and the primer 2 applied to the window glass W, and between the dam rubber 7 attached to the window frame portion 16 and a group of the dam rubber 7 attached to the window glass W and the positioning members 50A and 50B, as shown in FIG. 10. A peripheral portion of the window glass W and the window frame portion 16 of the vehicle body 10 may be covered by a ornamental border 6 as shown by a dot-dash line in FIG. 10 so that the primers 2 and 8, dam rubbers 4 and 7, adhesive agent 5 and positioning members 50A and 50B are put out of sight from the outside of the vehicle body 10.

Although, in the embodiment described above, the positioning members 50A and 50B are attached to the window frame portion 16 of the vehicle body 10 after the primer 8 is applied to the window frame portion 16, it is possible to attach the positioning members 50A and 50B to the window frame portion 16 before the primer 8 is applied to the window frame portion 16. Further, it is also possible to arrange the image sensors 91 and 92 to be shifted by a movable device other than the robot 70 or to be fixed at predetermined locations in the window glass setting station STw.

Figure 13:
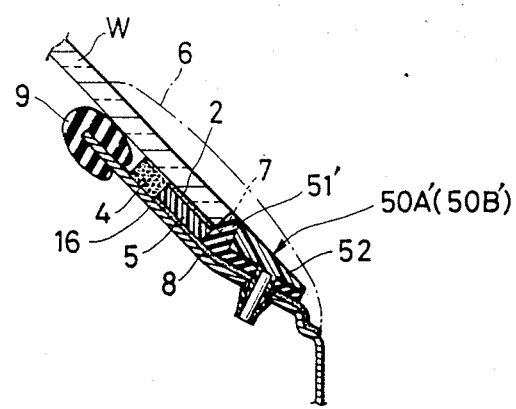
FIG. 13 is a schematic fragmentary sectional view showing a part of a window frame portion of a vehicle body to which a window glass is fitted in accordance with the second embodiment of method according to the present invention.

FIGS. 11 to 13 are illustrations used for explanation of a second embodiment of method of mounting a window glass on a vehicle body according to the present invention.

In the case of second embodiment also, the window glass W is mounted on the vehicle 10 in the window glass setting station STw as shown in FIG. 7 and the vehicle body 10 is conveyed to the window glass setting station STw after passing through the primer applying station STp as shown in FIG. 1.

In the process according to the second embodiment, the working path for each of the robots 20A and 20B in the primer applying station STp is so arranged that the primer holder 30 causes the brush 30a to scan over a window glass supporting area P' which is provided on the window frame portion 16 of the vehicle body, 10 to be bonded with the window glass W and shown as an area surrounded by a dot-dash line in FIG. 11 and a couple of areas Pa and Pb which are provided also on the window frame portion 16 to surround respectively the mounting holes 18A and 18B and shown as areas surrounded by double dot-dash lines in FIG. 11.

With the operation of each of the robots 20A and 20B which moves along the working path arranged as mentioned above, the primer 8 is applied to the window glass supporting area P' and the areas Pa and Pb provided on the window frame portion 16 of the vehicle body 10, as shown partially in FIG. 12.

After such application of the primer 8 to the window glass supporting area P' and the areas Pa and Pb provided on the window frame portion 16 of the vehicle body 10, positioning members 50A' and 50B' for defining the position of the window glass W are mounted by a worker on the areas Pa and Pb of the window frame portion 16, which are covered by the primer 8, so as to engage with the mounting holes 18A and 18B, respectively, as shown in FIG. 12. Each of the positioning member 50A' and 50B' comprises a body element 51' made of, for example, white rubber and the fastening element 52 as described above with reference to FIG. 4. The body element 51' is provided with a rectangular center hole 54'.

When each of the positioning members 50A' and 50B' is mounted on the window frame portion 16 of the vehicle body 10, as shown in FIG. 12, the body element 51' is placed on the area Pa or Pb of the window frame portion 16 which surrounds the mounting hole 18A or 18B and is covered by the primer 8 with the spacer 53 which is put between the area Pa or Pb and the body member 51' so that both the rectangular center hole 54' of the body member 51' and the rectangular center hole 55 of the spacer 53 are positioned on the mounting hole 18A or 18B. Then, the square tube portion 52b of the fastening element 52 is inserted from the upper side of the body element 51' into the rectangular center hole 54' of the body element 51', the rectangular center hole 55 of the spacer 53, and the mounting hole 18A or 18B, so that the flat portion 52a of the fastening element 52 is put on the body element 51' and the resilient projections 52c provided on the square tube portion 52b of the fastening element 52 engage with the under surface of the window frame portion 16. As a result, the positioning members 50A' and 50B' which are engaged respectively with the mounting holes 18A and 18B are attached to the window frame portion 16 of the vehicle body 10 in such a manner as to be surrounded by the primer 8 covering the areas Pa and Pb of the window frame portion 16.

The vehicle body 10 in which the positioning members 50A' and 50B' are attached to the window frame portion 16 is transported to be placed in the window glass setting station STw and the window glass W is fitted to the window frame portion 16 of the vehicle body 10 in the same manner as the first embodiment. In the process of fitting the window glass W to the window frame portion 16 of the vehicle body 10, locations of the positioning members 50A' and 50B' on the vehicle body 10 are detected respectively by the image sensors 91 and 92 mounted on the robot 70 which is installed in the window glass setting station STw, and detection output signals Sc and Sd obtained respectively from the image sensors 91 and 92 are supplied to the image signal processing unit 150 to be used for modifying the working conditions for the robot 70 in response to positional deviations accompanying with the vehicle body 10 placed in the window glass setting station STw.

In this embodiment, since each of the positioning members 50A' and 50B' attached to the window frame portion 16 is colored white and surrounded by the primer 8 which covers the areas Pa and Pb of the window frame portion 16 and is colored black, a conspicuous difference in brightness of color appears between the positioning member 50A' and the area Pa of the the window frame portion 16 and between the positioning member 50B' and the area Pb of the window frame portion 16, and therefore, the positioning members 50A' and 50B' are distinguished clearly from the vehicle body 10 by the image sensors 91 and 92, respectively. Accordingly, the locations of the positioning members 50A' and 50B' are detected correctly by the image sensors 91 and 92 regardless of a color arrangement of the vehicle body 10.

Through the above described process, the window glass W is mounted on the vehicle body 10 with hardening of the adhesive agent 5 which is put between the primer 8 applied to the window glass supporting area P' of the window frame portion 16 of the vehicle body 10 and the primer 2 applied to the window glass W, and between the dam rubber 7 attached to the window frame portion 16 and a group of the dam rubber 7 attached to the window glass W and the positioning members 50A' and 50B', as shown in FIG. 13. In this case also, the weather strip 9 is provided to the inside margin of the window frame portion 16, and the peripheral portion of the window glass W and the window frame portion 16 of the vehicle body 10 may be covered by the ornamental border 6 as shown by a dot-dash line in FIG. 13.

Figure 14:
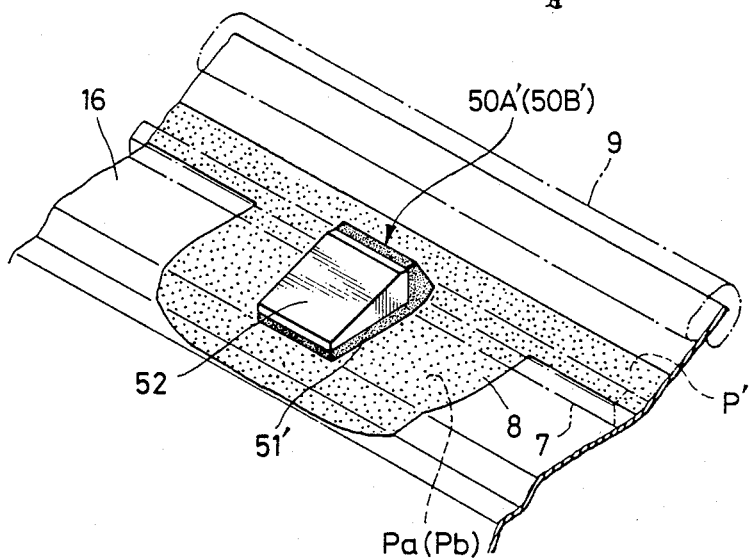
FIG. 14 is a schematic illustration used for explaining a step of attaching a positioning member to a vehicle body in a third embodiment of method according to the present invention.
Figure 15:
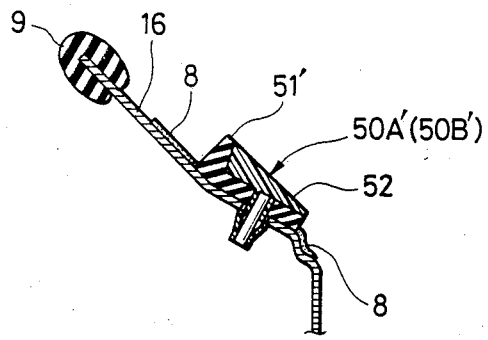
FIG. 15 is a schematic fragmentary sectional view showing a part of a window frame portion of a vehicle body to which a window glass is fitted in accordance with the third embodiment of method according to the present invention.

Although, in the above described second embodiment, the positioning members 50A' and 50B' are attached to the window frame portion 16 of the vehicle body 10 after the primer 8 is applied to the window glass supporting area P' and the areas Pa and Pb of the window frame portion 16, it is possible to attach the positioning members 50A' and 50B' to the window frame portion 16 before the primer 8 is applied to the window frame portion 16, as shown in FIGS. 14 and 15 in which a third embodiment of method of mounting a window glass on a vehicle body according to the present invention is indicated.

In the third embodiment, the positioning members 50A' and 50B' each comprising the base element 51' and the fastening element 52 are attached directly to the areas Pa and Pb of the window frame portion 16 of the vehicle body 10, respectively. Then, the primer 8 is applied to the window glass supporting area P' of the window frame portion 16 in the same manner as the second embodiment and further applied also to the areas Pa and Pb so as to surround the positioning members 50A' and 50B', as shown in FIGS. 14 and 15. In this case also, merits and advantages which are the same as those of the second embodiment can be obtained in the process of fitting the window glass W to the window frame portion 16 of the vehicle body 10.

Although illustrative examples of the positioning members 50A, 50B, 50A' and 50B' have been described in detail with reference to the drawings, it is to be understood that the positioning member used in the method according to the present invention is not limited thereto, and that various changes and modifications may be effected thereto so as to make a difference in brightness cf color perceptible for the image sensors 91 and 92 between the window frame portion 16 of the vehicle body 10 and at least a part of the positioning member.

What is claimed is:

1. A method of mounting a window glass on a vehicle body comprising the steps of:
    attaching a positioning member for defining a position of the window glass to a window frame portion of the vehicle body, said positioning member comprising at least a first element forming a central part of an upper surface of said positioning member and a second element engaged with said first element for forming a peripheral part of the upper surface around said central part, and said first element being different in brightness of color from said second element so as to make a different in brightness of color perceptible for an image sensor between said window frame portion and said first element,
    detecting a location of said first element of the positioning member by means of said image sensor, and
    fitting the window glass to said window frame portion by means of a robot operative to move along a working path which is modified in response to detection output of said image sensor.

2. A method according to claim 1, wherein the window glass is bonded with said window frame portion by adhesive agent.

3. A method according to claim 1, wherein said positioning member comprises a base element provided thereon with a central hole and forming said peripheral part of the upper surface and a fastening element having an engaging portion inserted into the central hole of said base element to engage with said window frame portion so as to fasten said base element to said window frame portion and forming said central part of the upper surface.

4. A method according to claim 1, wherein a color arrangement made by said central and peripheral parts of the upper surface is kept unchangeable regardless of color of the vehicle body.

5. A method according to claim 4, wherein said central part of the upper surface is colored black and said peripheral part of the upper surface is colored white.

6. A method according to claim 1, wherein said image sensor is arranged to detect said first element of the positioning member with a substantially constant attitude in relation to a reference plane and the upper surface of the positioning member is disposed at a substantially constant angle in relation to said reference plane.

7. A method of mounting a window glass on a vehicle body comprising the steps of:
    attaching a positioning member for defining a position of the window glass to a window frame portion of the vehicle body in such a manner a part of said window frame portion, which is covered by colored material, surrounds said positioning member so as to make a difference in brightness of color perceptible for an image sensor between said window frame portion and said positioning member,
    detecting a location of said positioning member on said window frame portion by means of said image sensor, and
    fitting the window glass to said window frame portion by means of a robot operative to move along a working path which is modified in response to a detection output of said image sensor.

8. A method according to claim 7, wherein at least a part of said window frame portion adjacent to said positioning member attached to said window frame portion and a window glass supporting area provided on said window frame portion to be bonded with the window glass are covered with a primer so as to make the difference in brightness of color perceptible for said image sensor between said window frame portion and said positioning member.

9. A method according to claim 8, wherein the part of said window frame portion covered by the primer is defined to surround said positioning member.

10. A method according to claim 9, wherein a color arrangement made by the primer covering the part of said window frame portion and said positioning member is kept unchangeable regardless of color of the vehicle body.

11. A method according to claim 10, wherein the primer covering the part of said window frame portion is colored black and said positioning member is colored white.

12. A method according to claim 8, wherein said window glass is provided with adhesive agent at its peripheral portion with which said window glass supporting area on said window frame portion comes in contact.

13. A method of mounting a window glass on a vehicle body comprising the steps of:
attaching a positioning member for defining a position of the window glass to a window frame portion of the vehicle body, said positioning member having a central part of an upper surface thereof and a peripheral part of the upper surface around said central part which are arranged to be different in brightness of color perceptible for an image sensor between said window frame portion and said positioning member, and a color arrangement made by said central and peripheral parts of the upper surface being kept unchangeable regardless of color of the vehicle body, detecting a location of said positioning member on said window frame portion by means of said image sensor, and fitting the window glass to said window frame portion by means of a robot operative to move along a working path which is modified in response to a detection output of said image sensor.

14. A method according to claim 13, wherein said central part of upper surface is colored black and said peripheral part of the upper surface is colored white.

15. A method according to claim 13, wherein said image sensor is arranged to detect the location of said positioning member with a substantially constant attitude in relation to a reference plane and the upper surface of said positioning member is disposed at a substantially constant angle in relation to said reference plane.

16. A method according to claim 13, wherein said window glass is bonded with said window frame portion by adhesive agent.

* * * * *